United States Patent
Wan

[19]

[11] Patent Number: 6,124,674

[45] Date of Patent: Sep. 26, 2000

[54] MULTI-SETTING AND EASY-TO-INSTALL LIGHT SWITCH CONTROLLER

[75] Inventor: David Wan, Hsin-Tein, Taiwan

[73] Assignee: King-I Electromechanical Industry Co., Ltd., Taipei Hsien, Taiwan

[21] Appl. No.: 09/276,787

[22] Filed: Mar. 26, 1999

[51] Int. Cl.[7] ...................................................... H01K 7/00
[52] U.S. Cl. ................... 315/76; 307/132 E; 340/815.49
[58] Field of Search .............................. 315/76, 307, 360, 315/DIG. 4; 307/132 E, 132 T, 132 V; 340/309.2, 815.48, 815.49

[56] References Cited

U.S. PATENT DOCUMENTS

| | | | |
|---|---|---|---|
| 3,925,639 | 12/1975 | Hester | 340/146.32 |
| 4,833,339 | 5/1989 | Luchaco et al. | 307/132 E |
| 4,862,036 | 8/1989 | Kriss, II | 315/76 |
| 5,471,359 | 11/1995 | Simpson et al. | 361/93 |
| 5,659,297 | 8/1997 | Tatavoosian | 340/815.49 |
| 5,903,107 | 5/1999 | Wade | 315/76 |
| 5,933,019 | 8/1999 | Depue | 307/132 E |

*Primary Examiner*—Don Wong
*Assistant Examiner*—Thuy Vinh Tran
*Attorney, Agent, or Firm*—Bacon & Thomas, PLLC

[57] ABSTRACT

A switch controller for providing on/off timing control of lights including a base unit, an electronic unit, and a cover unit. The electronic unit includes two printed circuit boards, one of which includes an integrated circuit controller for controlling an LCD display and for permitting input of timing information via buttons associated with the LCD display, and the other of which supports a relay, neon lamp, and transistors. The relay includes a pair of reed contacts for connecting a light to a power supply in response to the timing information. The neon lamp is dimmed whenever the switch is in an off status in order to provide a guide to enable location of the switch controller in the dark.

3 Claims, 4 Drawing Sheets

MULTI-SETTING AND EASY-TO-INSTALL LIGHT SWITCH CONTROLLER

BACKGROUND OF THE INVENTION

This invention relates to a switch-featuring ON/OFF timing control of lights. This multi-setting and easy-to-install light switch controller consists of a cover unit, a base unit, and an electronic unit. The electronic unit which contains two Printed Circuit Board Assemblies (hereafter called PCBAs) in-between the case unit and base unit provides the function of setting up information and trigging of relays to perform ON/OFF control of lights. A commercial common-use contact maker can be fitted to this switch. Based on the design concept and structure of this switch, the installation of this switch will not be in conflict with any conventional switches. By this design a user is able to set the user's own schedule to automatically turn on or off the lights at a designated time.

During the last twenty years there has been rapid progress in developing electronic devices. It is becoming increasingly apparent that a product with multiple functions is the new trend. The conventional light switch controller has many drawbacks such as (1) it must be activated by hands;(2) it lacks of the function of setting on/off timing; (3) it inherently interferes with some light devices ;(4) it is compatible problems with some existent light switches.

SUMMARY OF INVENTION

Therefore the primary object of the present invention is to provide a multifunction light switch controller that makes automatic control and user friendly light switching become possible. The present invention, a multi-setting and easy-to-install light switch controller, uses a relay as the basic element for its operation. In general, a reference time is provided to the switch controller. When the actual time matches the reference time, the relay is trigged and forces the switch to turn on or off. In addition the relay of the present invention uses commonly used commercial reed contacts. There will be no incompatability phenomenon. It is concluded that the present invention provides an easy and flexible setup light switch controller based on users'schedules.

DETAILED DESCRIPTION OF THE PREFERRED EMBODIMENTS

Figure 1:
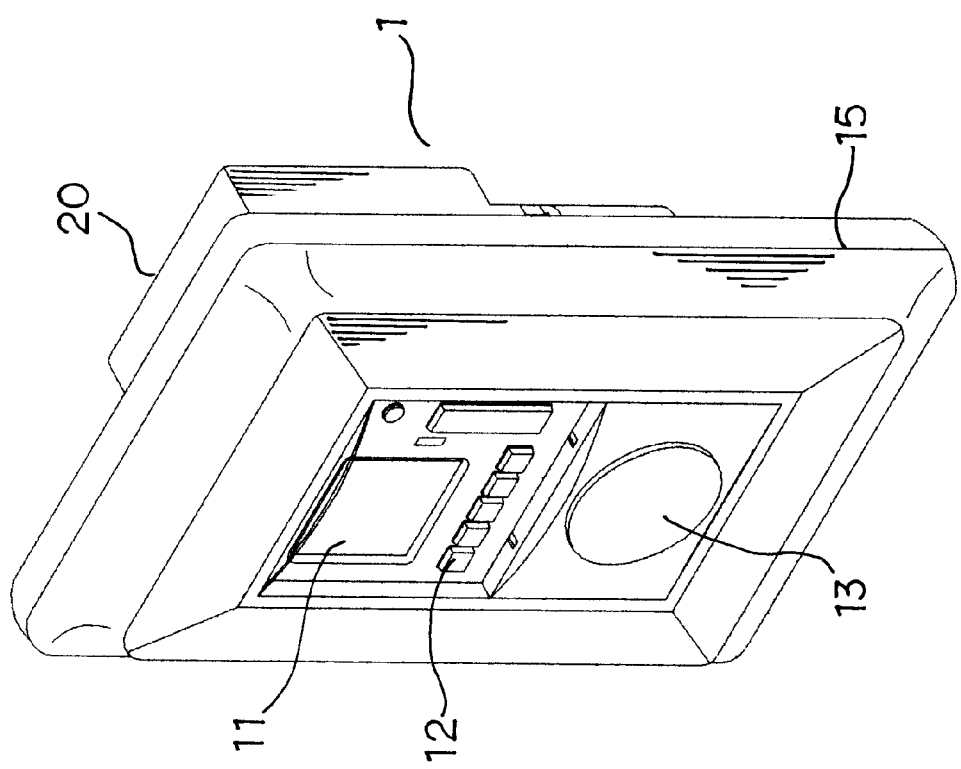
FIG. 1 is a diagram showing a preferred light switch controller.
Figure 2:
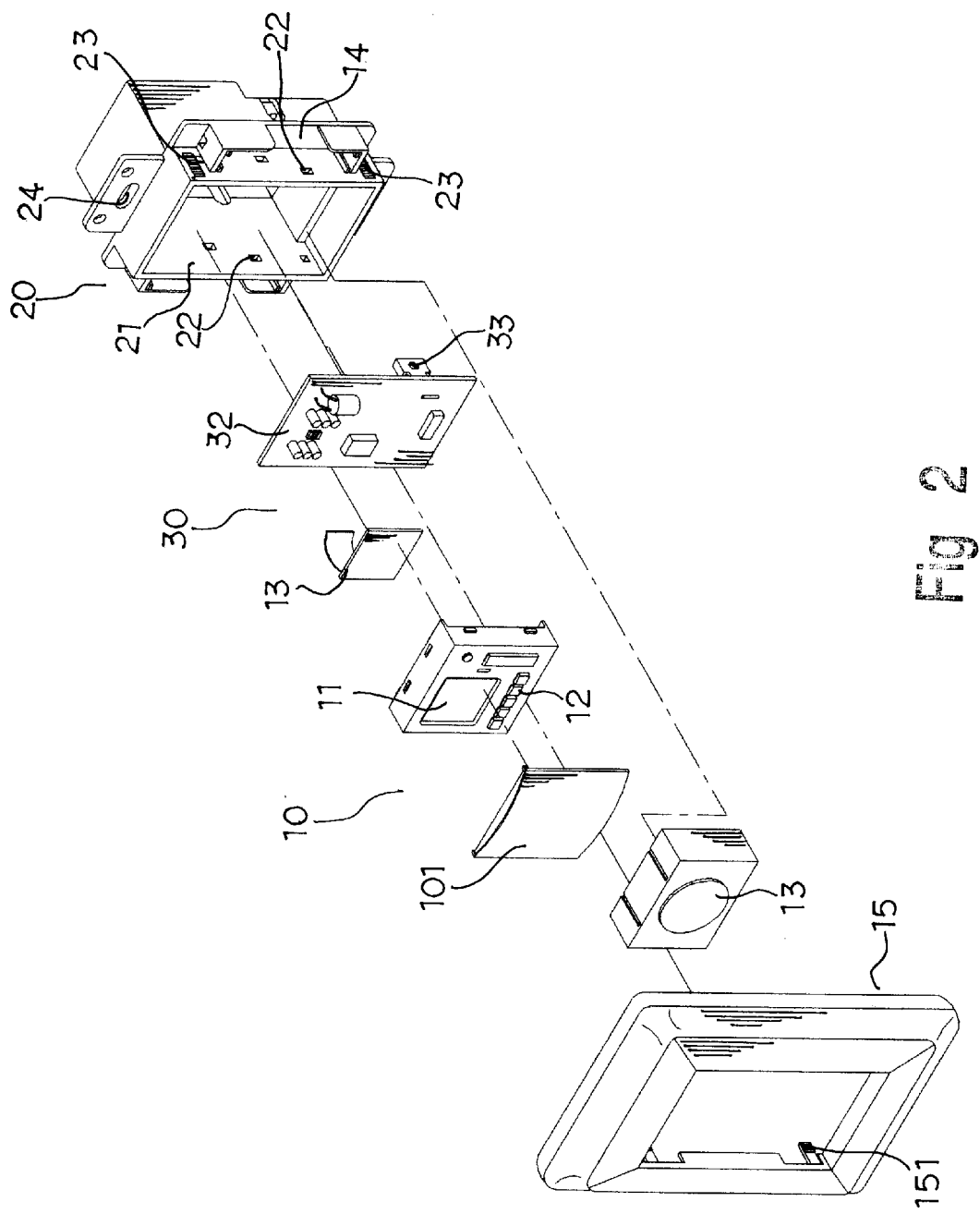
FIG. 2 is a diagram showing the detailed structure of the preferred light switch controller.
Figure 3:
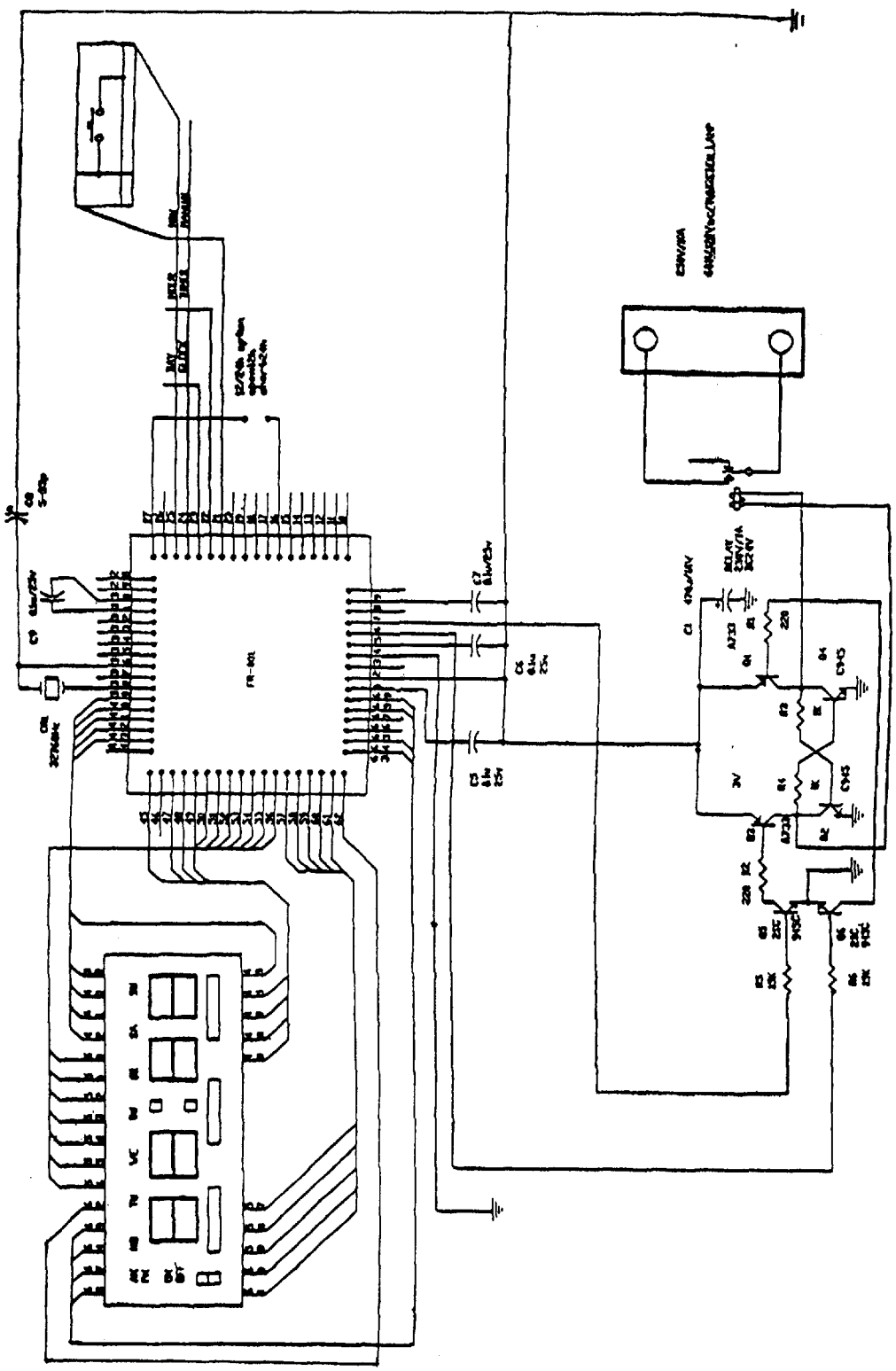
FIG. 3 is a diagram showing the electronic layout design of the preferred light switch controller.
Figure 4:
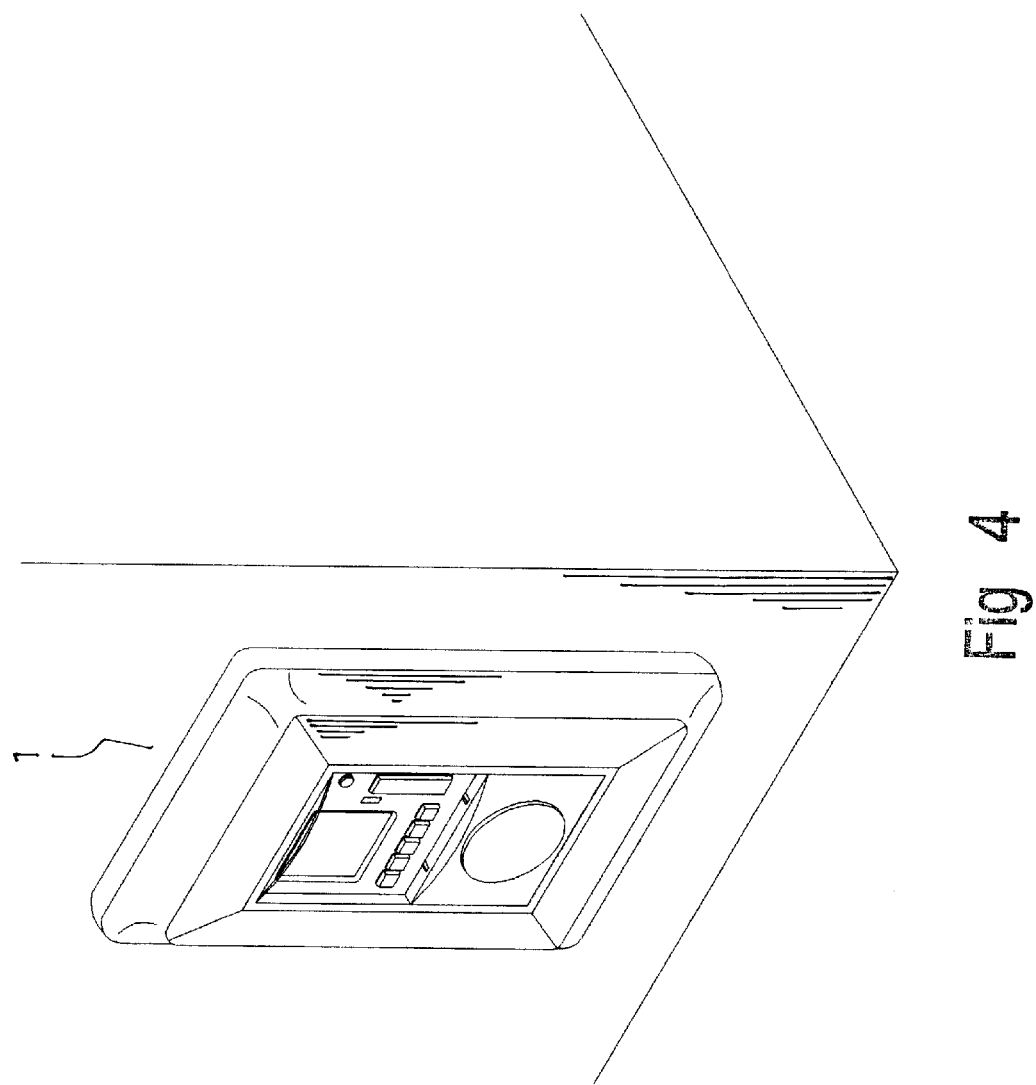
FIG. 4 is a diagram showing the actual use of the preferred light switch controller.

Referring to FIGS. 1 and 2, the embodiments of the multi-setting and easy-to-install light switch controller 1 of the present invention consists of a cover unit, a base unit, and an electronic unit.

The cover unit 10 is mainly made up of a Liquid Crystal Display (LCD) 11, functional buttons 12, a circular cover 13, battery cartridges 14, and a front panel 15. The setup information will be keyed in by the functional buttons 12 and be displayed on LCD 11. The U shape front panel 15 is designed for easy installation of batteries.

The base unit 20 has a reserved space 21 for the electronic in a switch fitting, openings 22 for receiving detents on the LCD display 11, and slots 23 for receiving posts 151 on the front panel 15 base unit 20 by screws. The electronic unit 30 consists of two printed circuit board assemblies, PCBA_A 31 and $PCBA_{13}$ B 32 which are placed between cover unit 10 and base unit 20. The PCBA_A 31 made up of an IC is a main control circuit. With connections of the functional buttons, PCBA_A 31 transmits readable information to LCD11. PCBA_B 32 consists of a relay, a neon lamp, and transistors. The relay has a pair of reed contacts 33 for the connection of the power source. Two batteries can be fitted into the battery cartridges 14 for providing the energy needed for the relay and PCBAs. According to the structure described above the procedure to install this switch is the sequence of 1. connecting the reed contacts 33,
2. screwing the base unit,into a switch fitting
3. placing the electronic unit into the base unit
4. installing the cover unit to form an actual device to set up the schedule by pressing the functional buttons.

Here is a brief user guide about the setup of this light switch controller

Press the "PROG" (the first button from left). This will lead you to the first setup stage for ON/OFF. For example, Press the "PROG" to display "1 ON--:--". Press the "PROG") again to display "1 OFF --:--", and so on. There will be eight different settings for consecutive pressing of "PROG".

Press "DAY" to display the day of the week. For example, "Mo, Tu, We, Su".

Press "HOUR" to set the hour.

Press "MN" to set the minute.

Press "CLOCK" to display the current time.

Press "RESET" to clear all the information off including the clock.

Press "MANUAL" to allow you to force switch off or on in existing setting.

It can be seen that the design of this invention is built on an on/off relay and an electronic circuit. The on/off status of a light at a designated minute can be obtained automatically by adjusting the day/time information through the functional buttons based on a user's schedule. The other important point related to this invention is that this device only consumes a small amount of energy in an instant that the reel contact is triggering. Most of the time the relay is not in action and the only energy consumption is caused by the LCD and IC which consume less of energy then clues triggering of a relay. It is clear that this device has a benefit of low energy consumption. The neon lamp under the circular cover is dimmed whenever the switch is in an OFF status. The dimmed light is to guide the location of this switch in the dark. In addition the circular cover is designed to be an independent on/off switch so that the activation of the circular cover will not conflict with any previous setting.

It can be concluded that the relays and the on/off status of a light activated by users'proper setting play an important role in this application. In addition, the lighted neon lamp indicates the relay is triggered to the ON position. Besides, many different kinds of lights can be applied on this switch, since it has a capability of preventing interference. Some other important points are that the reed contacts used by this switch have the same structure as other commercial reed contacts, and two batteries are used as the power source. This exclusive design makes this switch widely compatible.

I claim:

1. A multi-setting and easy-to-install light switch controller, comprising:

a cover unit; a base unit; and an electronic unit, wherein the cover unit includes an LCD display, a plurality of function buttons arranged to permit entry of timing information, and a circular semi-transparent cover;

wherein the base unit is arranged to accommodate a pair of printed circuit boards forming said electronic unit, a first of said circuit boards including an IC controller for controlling the LCD display, for receiving said timing information, and for activating an on/off relay when a time indicated by said entered timing information matches an actual time, and a second of said circuit boards including said on/off relay, transistors, and a neon lamp situated under said circular semi-transparent cover, and wherein said base unit further includes at least one battery compartment; and wherein said relay includes a pair of reed contacts for switching on and off power to a light controlled by controller.

2. A light switch controller as claimed in claim 1, wherein said neon lamp is dimmed whenever said switch is in an off status, thereby providing a guide to enable location of the switch in the dark.

3. A light switch controller as claimed in claim 1, wherein said switch controller is normally in a stand-by status to reduce power consumption during times when said relay is not being triggered.

* * * * *